(12) United States Patent
Scholz

(10) Patent No.: US 10,615,429 B2
(45) Date of Patent: Apr. 7, 2020

(54) FUEL CELL AND FUEL CELL STACK

(71) Applicants: VOLKSWAGEN AG, Wolfsburg (DE); AUDI AG, Ingolstadt (DE)

(72) Inventor: Hannes Scholz, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 109 days.

(21) Appl. No.: 15/746,769

(22) PCT Filed: Jul. 21, 2016

(86) PCT No.: PCT/EP2016/067399
§ 371 (c)(1),
(2) Date: Jan. 22, 2018

(87) PCT Pub. No.: WO2017/013201
PCT Pub. Date: Jan. 26, 2017

(65) Prior Publication Data
US 2018/0212258 A1    Jul. 26, 2018

(30) Foreign Application Priority Data

Jul. 23, 2015 (DE) .................. 10 2015 213 950

(51) Int. Cl.
*H01M 2/38* (2006.01)
*H01M 8/0258* (2016.01)
(Continued)

(52) U.S. Cl.
CPC ....... *H01M 8/0258* (2013.01); *H01M 8/0232* (2013.01); *H01M 8/1004* (2013.01);
(Continued)

(58) Field of Classification Search
CPC .. H01M 8/0232; H01M 8/0258; H01M 8/241; H01M 8/1004; H01M 8/1018; H01M 2008/1095
See application file for complete search history.

(56) References Cited

U.S. PATENT DOCUMENTS 5,641,586 A * 6/1997 Wilson ................. H01M 8/023
429/480
6,146,780 A 11/2000 Cisar et al.
(Continued)

FOREIGN PATENT DOCUMENTS

DE          35 12 866 C2    9/1989
DE    11 2007 000 282 T5   12/2008
(Continued)

OTHER PUBLICATIONS

Machine translation for Mizuno et al., JP 20052-322568 A. (Year: 2019).*

*Primary Examiner* — Raymond Alejandro
(74) *Attorney, Agent, or Firm* — Seed Intellectual Property Law Group LLP

(57) ABSTRACT

The invention relates to a fuel cell stack (1), comprising: —bipolar plates (10), each having an active region (13*a*), wherein a surface of the bipolar plate is formed non-profiled at least in the active region (13*a*), —a membrane electrode assembly (20), arranged between two bipolar plates (10), and—a gas distribution layer (30) arranged between the membrane electrode assembly (20) and at least one of the bipolar plates (10), wherein the gas distribution layer (30) comprises a porous flow body (31). It is provided that the gas distribution layer (30) includes recesses (32) in the active region (13*a*).

16 Claims, 3 Drawing Sheets

Figure 1:
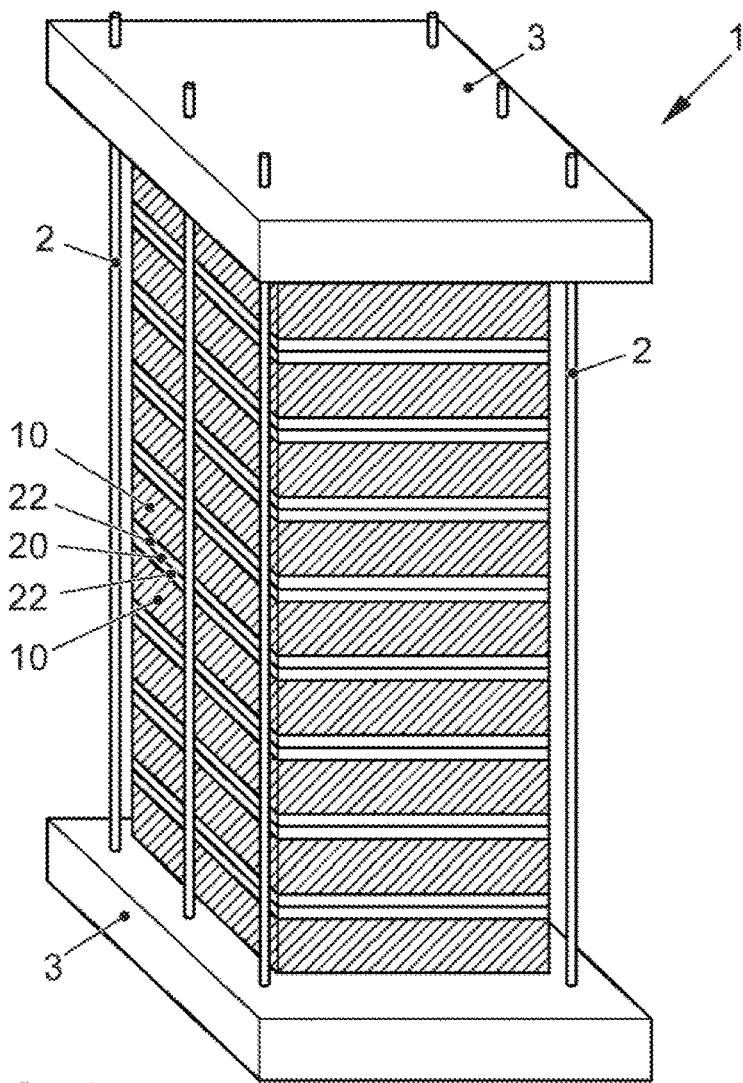

(51) Int. Cl.
*H01M 8/1004* (2016.01)
*H01M 8/1018* (2016.01)
*H01M 8/0232* (2016.01)
*H01M 8/241* (2016.01)

(52) U.S. Cl.
CPC ......... *H01M 8/1018* (2013.01); *H01M 8/241* (2013.01); *H01M 2008/1095* (2013.01)

(56) References Cited

U.S. PATENT DOCUMENTS

| | | |
|---|---|---|
| 6,770,394 B2 | 8/2004 | Appleby et al. |
| 2003/0022052 A1* | 1/2003 | Kearl ................ H01M 8/0204 429/423 |

FOREIGN PATENT DOCUMENTS

| | | |
|---|---|---|
| DE | 11 2007 000 638 T5 | 4/2009 |
| DE | 11 2007 002 486 T5 | 9/2009 |
| DE | 10 2012 218 590 A1 | 4/2014 |
| EP | 1 381 101 A2 | 1/2004 |
| JP | 2005-322595 A | 11/2005 |
| JP | 2005322568 A * | 11/2005 |

\* cited by examiner

FUEL CELL AND FUEL CELL STACK

The invention relates to a fuel cell stack, a plurality of bipolar plates, each having an active region, wherein a surface of the bipolar plate is formed non-profiled at least in the active region, a membrane electrode assembly, arranged between two bipolar plates, and a gas distribution layer arranged between the membrane electrode assembly and at least one of the bipolar plates, wherein the gas distribution layer comprises a porous flow body.

Fuel cells use the electrochemical conversion of a fuel by reaction with oxygen to form water in order to generate electrical energy. For this purpose, fuel cells contain as core component so-called membrane electrode assemblies (MEA) which are a combination of an ion-conductive, in particular proton-conductive, membrane and of an electrode (anode and cathode) respectively arranged on both sides of the membrane. Additionally, gas diffusion layers (GDL) may be arranged on both sides of the membrane electrode assembly on the sides of the electrodes facing away from the membrane. Usually, the fuel cell is formed by a plurality of MEAs arranged in a stack whose electrical power adds up. During operation of the fuel cell, the fuel, in particular hydrogen $H_2$ or a gas mixture containing hydrogen, is guided to the anode where an electrochemical oxidation of $H_2$ to $H^+$ with loss of electrons takes place. A transport of the $H^+$ protons from the anode chamber into the cathode chamber is effected (in a water-bound or water-free manner) via the electrolytes or the membrane, which separates the reaction chambers from each other in a gas-tight and electrically insulated manner. The electrons provided at the anode are guided to the cathode via an electrical line. Oxygen or a gas mixture containing oxygen is fed to the cathode so that a reduction of $O_2$ to $H_2O$ takes place under acquisition of the protons and electrons.

The fuel cell is formed by a plurality of individual cells arranged in the stack, which is why this is also called a fuel cell stack. Between the membrane electrode assemblies are arranged bipolar plates, which ensure that the individual cells are supplied with the operating media, i.e. the reactants and a coolant. In addition, the bipolar plates ensure an electrically conductive contact to the membrane electrode assemblies.

Bipolar plates are usually constructed from a pair of profiled plate halves, each having a coolant side and a cell side. The two plates are arranged opposite each other and connected such that channels for transporting coolant form between the mutually facing coolant sides. In their active region, the plates have a group of grooves or channels, which form open flow fields on their cell sides for distributing the reactants over the surfaces of the respective anodes and cathodes. Between the plates coolant channels are formed within the bipolar plate and distribute coolant over the fuel cell stack in order to cool it.

An alternative to such profiled bipolar plates are those which are formed substantially planar in the active region. The flow fields which result from the profiling of the plates in the above-described bipolar plates are hereby replaced by flow bodies made of porous material.

Fuel cells having such non-profiled bipolar plates are known inter alia from U.S. Pat. No. 6,770,394 B2, DE 112007000638 T5, DE 112007002486 T5, and DE 112007000282 T5. Therein, porous bodies are described that are arranged on both sides of flat bipolar plates.

A combination of the described flow fields and porous flow body is disclosed in DE 102012218590 A1, wherein porous flow bodies are arranged on both sides of a non-profiled bipolar plate, which bodies are interrupted in some areas by flow channels resulting from a profile structure of the bipolar plate.

The described bipolar plates and fuel cells have the disadvantage that, although the volume of the fuel cell is reduced in comparison to profiled bipolar plates by the arrangement of a porous flow body, the volumetric power density is still not optimal. In addition, compared to conventional flow fields formed by flow channels, the use of porous flow bodies results in sluggish dynamic behavior, increased pressure loss on both gas sides, degraded water discharge, and unequal distribution of reactants on both sides of the membrane electrode assembly.

It is the object of the invention to provide a fuel cell that solves, or at least reduces, the problems of the prior art. In particular, a fuel cell having a bipolar plate is to be provided, allowing to increase the volumetric power density by reducing the design height and to improve mass transport.

This task is solved by a fuel cell having the features of the independent claims.

Thus, a first aspect of the invention relates to a fuel cell stack comprising a plurality of bipolar plates, each having an active region and being formed non-profiled in the active region. In the layer structure, a membrane electrode assembly is arranged between each two bipolar plates, with a gas distribution layer comprising a porous flow body being arranged between the membrane electrode assembly and at least one of the bipolar plates. According to the invention, it is provided that the gas distribution layer has recesses in the active region. The fuel cell stack is composed of stacked fuel cells, wherein, at least schematically, one bipolar plate of the stack has two halves. There thus results a respective layer structure of bipolar plate half/gas distribution layer/membrane electrode assembly/optional gas distribution layer/bipolar plate half for a fuel cell according to the invention, wherein at least one gas distribution layer comprises a flow body having recesses.

The advantage of the fuel cell stack according to the invention or of the fuel cell according to the invention lies in an increase in the power density compared to fuel cells of the prior art. The increase in power density compared to the conventional flow field of a profiled bipolar plate is achieved by reducing the design height since a porous flow body has a design height that is less than the profile height of a flow field of a profiled bipolar plate. At the same time, the use of the gas distribution layer according to the invention allows for improved mass transport.

In particular in comparison with the fuel cell disclosed in U.S. Pat. No. 6,770,394 B2, the fuel cell according to the invention has a lower pressure drop of the reactant gases since the flow channels in the gas distribution layer according to the invention consists of both diffuse flow channels, namely from fluid carrying connected pores of the flow body, and discrete flow channels in the form of the additional recesses. The recesses have a higher diameter than the diffuse flow channels of the flow body. As a result, the flow resistance in the gas distribution layer according to the invention is reduced. In addition, the recesses allow for a more uniform distribution of the gases, and thus improved fuel cell efficiency, longer life, and an overall more robust performance. The more uniform distribution results from the fact that the reactant gases are distributed quickly and uniformly in the recesses due to the increased diameter. A plurality of diffuse flow channels of the pores open into each of the recesses. Therefore, the reactant gas reaches the diffuse flow channels not only through the distribution region, but also via the recesses. If some of the diffuse flow channels have an increased flow resistance due to an impurity, the associated pressure loss does not extend over the entire active region, but is compensated for again by the recesses downstream of the impurity.

Compared to the prior art, the recesses of the invention also facilitate an improvement in the discharge of liquid water, which is in turn reflected in an increase in fuel cell efficiency, increased service life of the fuel cell or the fuel cell stack, and a more robust overall performance.

Bipolar plates according to the invention separate reaction gases and coolant from each other. They have inactive distribution regions for the supply and discharge and distribution of the operating media and an active region adjacent to the electrochemically active regions of the electrode spaces in the fuel cell stack.

The distribution region generally has breakthroughs or main gas channels in which reactant gas is guided onto the respective electrode side, i.e., the cathode side or anode side, and from there is distributed into the active region. Each electrode side of a bipolar plate generally has at least two distribution regions enclosing the active region.

The active region of the bipolar plate is defined by the region which is arranged adjacent to a membrane electrode assembly in the subsequent fuel cell stack and in which the fuel cell reaction takes place. In the active region, the bipolar plate according to the invention is formed non-profiled on at least one side.

The flow body is a porous, in particular macroporous, body having an open-pore structure, with the pores being connected to one another such that it results in a channel system of diffuse channels which is permeable for the respective reactant gas.

The porous flow body is preferably a body, i.e., a three-dimensional structure, of porous, in particular open-pored, material having a low flow resistance for the reactant gas, such as air or hydrogen. No discrete flow channels are formed within the flow body, but the reactant gas flows evenly through the entire porous flow body as a function of the flow resistance. The flow resistance is defined by the porosity and the pore diameter of the flow body on one hand and by any impurities, such as drops of water or the like, that may be present in the pores on the other hand.

The recesses are preferably closed or open, in particular discrete, channels. They preferably have a round, trapezoidal, or rectangular cross-section. If the recesses are formed as closed channels, they are preferably formed as hollow bodies in the flow body. In the embodiment as open channels, they are bounded by the flow body on at least two sides and by the membrane electrode assembly and/or the bipolar plate on one side. They are preferably distributed uniformly over the active region. The embodiment of the recesses as discrete channels allows for an improved mass transport. In addition, the flow resistance of the reactant gases is reduced to a particular degree in this embodiment and ensures a uniform distribution of the gases over the active region. The channel width and spacing are typically designed in the order of one millimeter, preferably in the range of 0.5 mm to 2 mm. The channel height or the height of the porous body, however, is preferably less than one millimeter. Thus, the orders of magnitude of profiled bipolar plates are essentially maintained.

Furthermore, it is preferred that the discrete channels extend at least partially over the active region, in particular between the distribution regions. This embodiment offers the advantage that the channels extend along the main flow direction of the reactant gases, which enhances the advantageous effect of the embodiment as a channel structure. Alternatively or additionally, the channels are embodied at least partially in a meandering pattern.

It is particularly advantageous if the recesses are formed as passage openings extending through the thickness of the gas distribution layer. In other words, the recesses have a depth (t) corresponding to a height (h) of the gas distribution layer. In this embodiment, the recesses have the maximum height and, with uniform shaping, such as a round or square cross-section, a maximum diameter. Since the flow resistance decreases proportionally to the diameter of the recesses, the flow resistance in this embodiment is further optimized. This in turn results in a reduced pressure loss of the reactant gases and an improved water discharge.

In a further embodiment, it is preferred that the flow body comprises a macroporous structure. This embodiment has the advantage that the reactant gas flows with the lowest possible flow resistance. The macroporous material preferably has a mean pore diameter of more than 50 µm. It is further preferred that the porosity of the flow body exceeds 50%, in particular 75%, preferably 80%, in particular 90%. With particular advantage, the mean pore diameter and/or the porosity of the flow body varies over the surface area and/or the height of the active region. In particular, it is preferred that a gradient of the mean pore diameter or the porosity is formed such that one or more edge regions of the flow body have a lower porosity and/or a smaller mean pore diameter than an inner region of the flow body. This embodiment has the advantage that, even though the reactant gas is distributed uniformly over the flow body and flows over the active region, the flow resistance in the direction of the edge regions of the flow body increases such that outflow of the reactant gas, and thus loss of reactant gas, is prevented or at least reduced.

In a further embodiment of the fuel cell according to the invention it is provided that the flow body comprises a metallic material. This embodiment has the advantage that the flow body is also electrically conductive and, in particular, includes a material that is physically and chemically similar to the bipolar plate. Electrical transition losses at the transition between the bipolar plate and the flow body are thus reduced. In addition, metallic materials can be processed very well to form porous materials and are chemically and physically stable under the conditions present in the fuel cell.

The metallic materials are processed for use as flow bodies, in particular as metal foams, or formed by means of a spacer sintering method. It is further preferred that the metallic material of the flow body has, as an alternative or in addition to the irregular pores of the metal foams or the sintered metals, uniform structures, such as tubular structures, honeycomb structures, or truss structures. The latter are preferably applied to the bipolar plate by means of printing methods or as a film.

It is particularly advantageous if the flow body is firmly bonded to the bipolar plate. This embodiment promotes conductivity, improves the processability of the bipolar plate, and reduces transmission losses at the transition between the flow body and the bipolar plate.

In a particularly preferred embodiment of the invention it is further provided that the membrane electrode assembly includes a gas diffusion layer which is adjacent to the gas distribution layer and has a porosity that is lower than the porosity of the gas distribution layer. The gas diffusion layer preferably has a mean pore diameter of 30 µm. The gas diffusion layer further fulfills the function of media distribution. In particular, with the arrangement between the membrane electrode assembly and gas distribution layer in the embodiment of the invention, the arrangement of the gas diffusion layer has the advantage that reactant gas is distributed outside the discrete flow channels of the recesses.

Alternatively, the membrane does not include a gas diffusion layer. The combination of discrete and diffuse channels can ensure mass transport without a gas diffusion layer. In this embodiment, a microporous layer is preferably arranged between the membrane electrode assembly and the gas distribution layer. This layer has physical characteristics (porosity, conductivity) similar to the gas diffusion layer, but preferably has a smaller mean pore diameter than the gas diffusion layer. The microporous layer typically comprises or consists of carbon particles (carbon black) that are bonded by PTFE and hydrophobized. By omitting the gas diffusion layer on at least one of the electrode sides of the membrane electrode assembly, the installation space of the fuel cell is further reduced by the height of the gas diffusion layer and the power density is increased accordingly.

Another aspect of the invention relates to a fuel cell stack comprising a plurality of fuel cells according to the invention arranged in a stack, wherein cooling channels are formed in at least one of the bipolar plates.

In a preferred embodiment, at least one of the bipolar plates includes no coolant channels. The embodiment of the invention of the fuel cell allows for the heat released in the MEA to be conducted well to the cooling medium. This allows for a reduction of the coolant channels. This can be achieved, for example, by reducing the height of the coolant channels and/or by omitting the coolant channels. Both alternatives result in an additional reduction in the design height of the respective fuel cell, and thus in an increased power density of the entire fuel cell stack.

In a further preferred embodiment, it is provided that bipolar plates are arranged in the fuel cell stack alternately with coolant channels and bipolar plates without coolant channels. This embodiment ensures that all fuel cells are optimally cooled and still achieves a reduction of the installation space height.

Another aspect of the invention relates to a fuel cell system including a fuel cell stack according to the invention and a vehicle including the same.

The various embodiments of the invention mentioned in this application may be combined advantageously with one another unless stated otherwise in individual cases.

Figure 2:
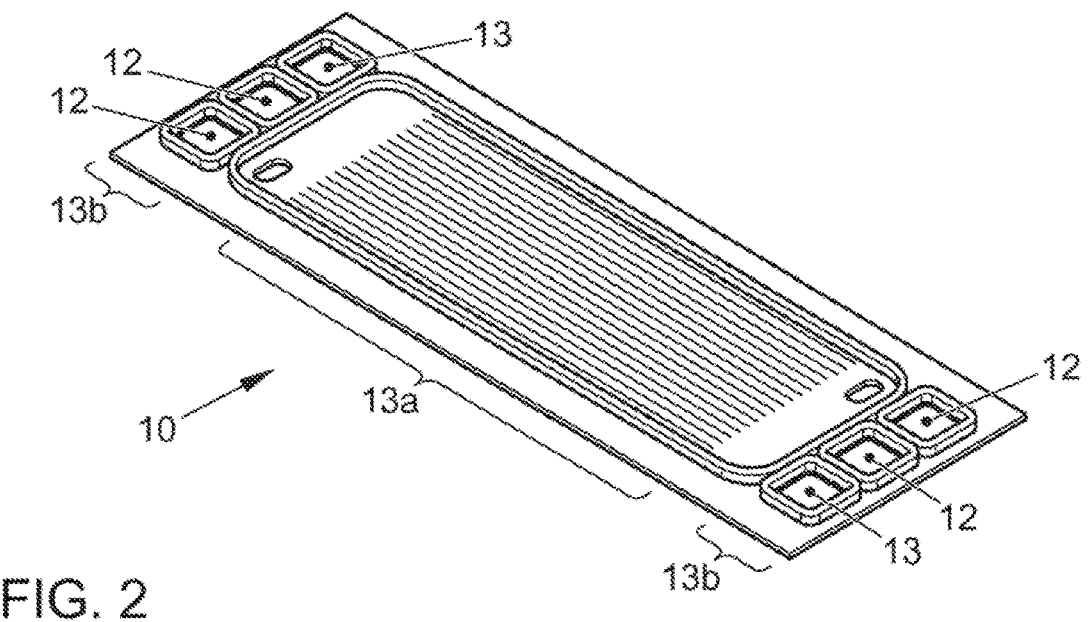
Figure 3:
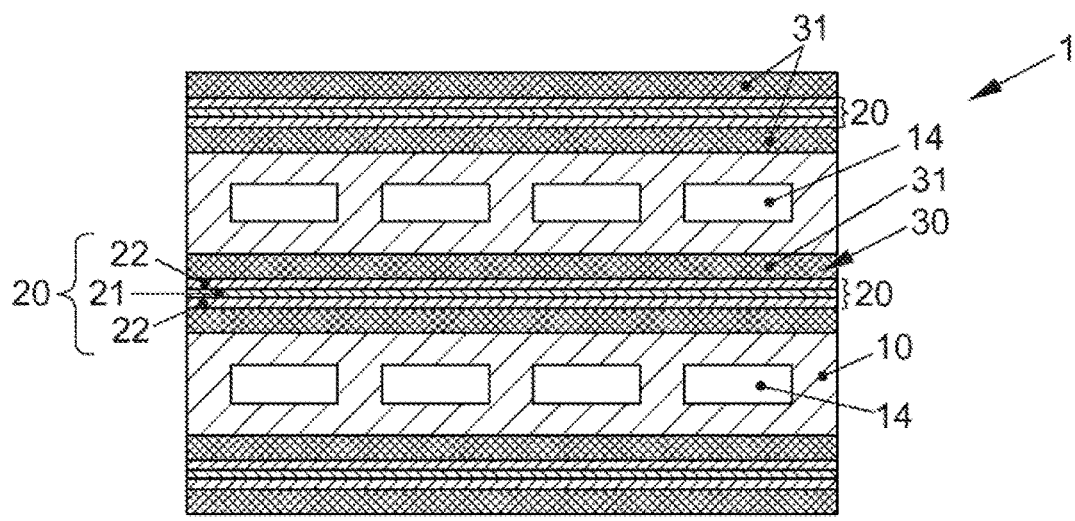
Figure 4:
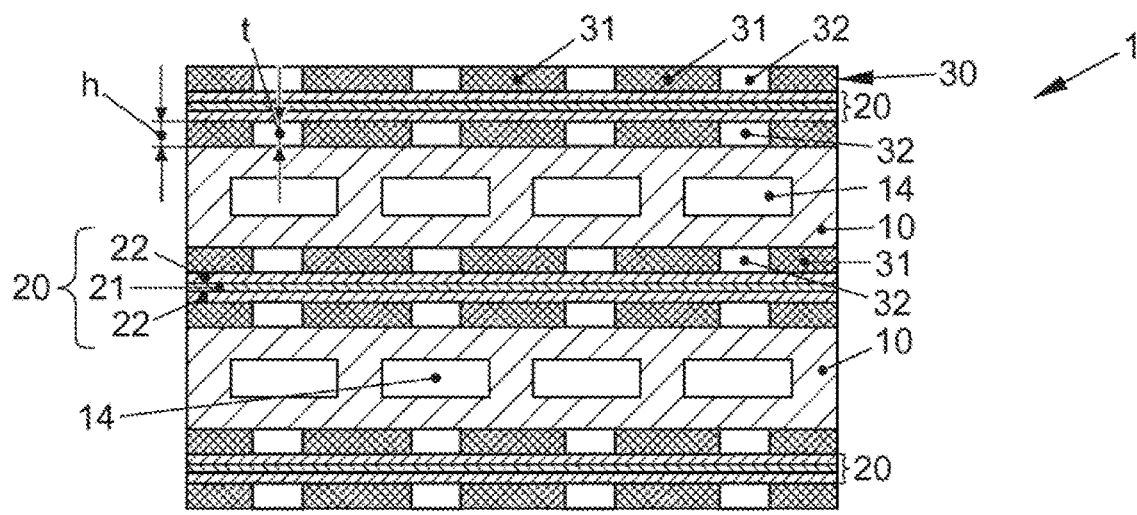
Figure 5:
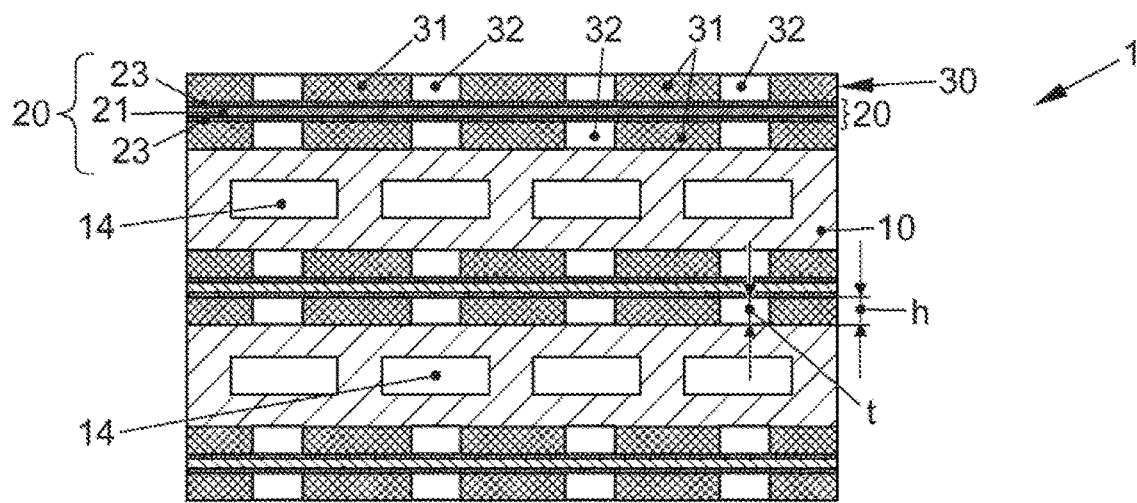
Figure 6:
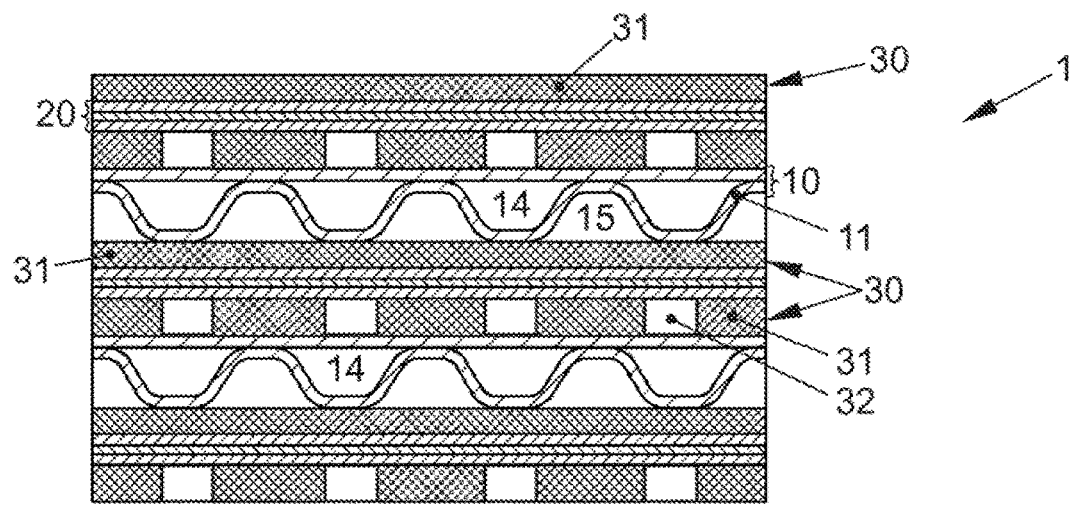
Figure 7:
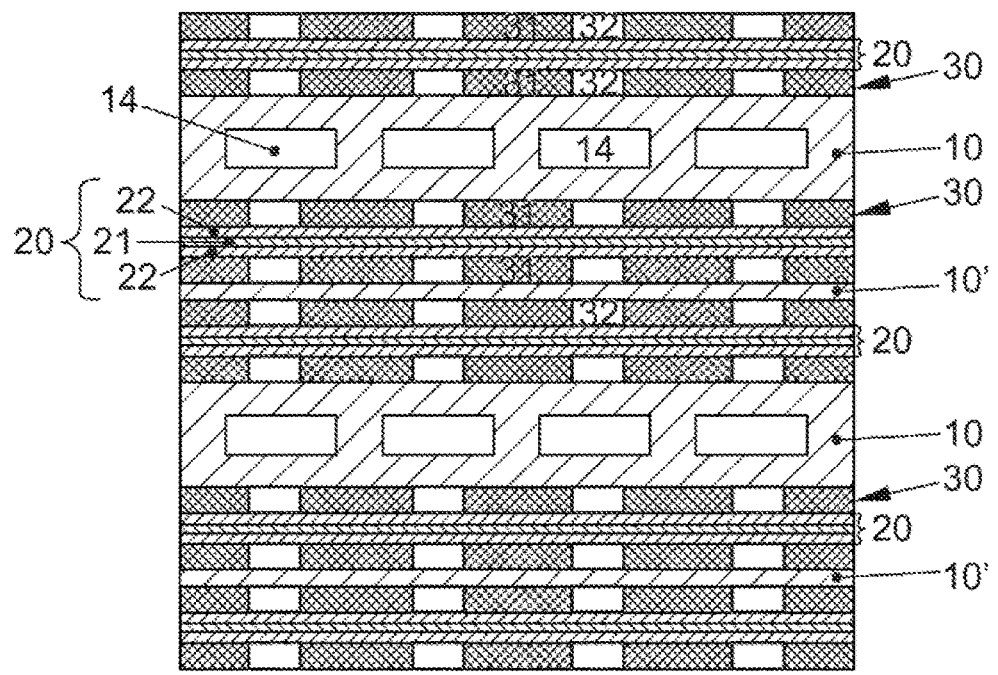

The invention is explained below in exemplary embodiments on the basis of the respective drawings. The following is shown:

FIG. 1 shows a schematic representation of a fuel cell stack,

FIG. 2 shows a schematic representation of a plan view of a bipolar plate according to a preferred embodiment of the invention, FIG. 3 shows a schematic sectional view of the cross-section of a fuel cell stack according to the prior art in the active region, FIG. 4 shows a schematic sectional view of the cross-section of a fuel cell stack in the active region according to a first embodiment of the invention, FIG. 5 shows a schematic sectional view of the cross-section of a fuel cell stack in the active region according to a second embodiment of the invention, FIG. 6 shows a schematic sectional view of the cross-section of a fuel cell stack in the active region according to a third embodiment of the invention, and FIG. 7 shows a schematic sectional view of the cross-section of a fuel cell stack in the active region according to a fourth embodiment of the invention.

FIG. 1 shows a fuel cell stack in a strongly schematic representation. The fuel cell stack 1 comprises two end plates 3 between which a plurality of stacked stack elements are arranged, which comprise bipolar plates 10 and membrane electrode assemblies 20. The bipolar plates 10 are stacked alternately with the membrane electrode assemblies 20. The membrane electrode assemblies 20 respectively comprise a membrane and, on both sides of the membrane, adjacent electrodes, namely an anode and a cathode (not shown). Adjacent to the electrodes, the membrane electrode assemblies 20 may also have gas diffusion layers 22. Between the bipolar plates 10 and the membrane electrode assemblies 20, sealing elements (not shown) are respectively arranged, sealing the anode and cathode rooms gas-tightly against the exterior. Between the end plates 3, the fuel cell stack 1 is pressed in by means of tension elements 2, such as drawbars or clamping plates.

In FIG. 1, only the narrow sides of the bipolar plates 10 and the membrane electrode assemblies 20 are visible. The main sides of the bipolar plates 10 and the membrane electrode assemblies 20 are adjacent to one another. The representation in FIG. 1 is not dimensionally accurate. Typically, the thickness of an individual cell consisting of a bipolar plate 10 and a membrane electrode assembly 20 is a few mm, in particular no more than 2 mm, wherein the membrane electrode assembly 20 is by far the thinner component. In addition, the number of individual cells usually is much greater than shown.

FIG. 2 shows a bipolar plate 10 in a plan view of an electrode side. The bipolar plate may comprise two plate halves 11. The bipolar plate 10 has an active region 13a which is adjacent to the distribution regions 13b on two sides. The distribution regions 13b here are adjacent to two opposite sides of the active region 13a. The distribution regions 13b each have two main gas channels 12 for providing two reactant gases and a main coolant channel 13. In the fuel cell stack 1, a reactant gas is conducted from one distribution region 13b, over the active region 13a, and to the other distribution region 13b.

The active region 13a of one of the plate halves 11 may have a profile structure. However, at least one of the plates is formed non-profiled in the active region 13a. Coolant channels 14 for guiding coolant are formed between the plate halves 11 in a negative profile structure of the at least one plate half 11. Alternatively, the bipolar plate 10 may be integrally formed and/or formed non-profiled on both sides in the active region. The coolant channels 14 are then not formed from a negative profile structure, but as cavities in the interior of the bipolar plate.

FIG. 3 shows a cross-sectional drawing of a section of the active region 13a of a fuel cell according to the prior art. Several bipolar plates 10 are arranged alternately with membrane electrode assemblies 20 to form a fuel cell stack 1. In this case, gas diffusion layers 22 are optionally arranged between the bipolar plates 10 and the membrane electrode assemblies 20, respectively. The bipolar plates 10 of the fuel cell according to the prior art each comprise a bipolar plate 10 that is non-profiled on both sides in the active region and which forms coolant channels 14 in the form of cavities in the interior. In the longitudinal direction, the coolant channels extend over the active region 13a of the bipolar plate 10 and fluidly connect the main coolant channels 13 of the two distribution regions 13b to one another. A gas distribution layer 30 is arranged on both sides of the bipolar plate 10. The gas distribution layer 30 comprises a porous flow body 31. The pores of the porous flow body 31 may be connected to each other and form a network of diffused channels in which reactant gases can be distributed in the active region 13a of the fuel cell.

In contrast, FIG. 4 shows a cross-section of a section of the active region 13a of a fuel cell according to the invention. Unlike the fuel cell of the prior art, the gas distribution layer 30 includes recesses 32 on at least one electrode side of a bipolar plate 10. These recesses 32 may be formed by depressions in the porous flow body 31 or, as shown, interrupt the flow body 31, so that a depth (t) of the recesses 32 corresponds to a height (h) of the gas distribution layer 30. The width of the recesses 32 preferably corresponds to 1 to 3 times the height (h) of the gas distribution layer 30, or 0.5 to 2 times the width of the flow body 31 between the recesses 32. The recesses are preferably arranged as open or closed channels (not shown), extending in a straight-line or meandering pattern over the active region of the fuel cell. The individual channels are preferably arranged essentially parallel to one another and do not overlap in the active region.

The porous flow body 31 may be, for example, a porous, in particular macroporous, material that is manufactured from a metal, for example. The porous flow body 15 has pores exceeding the mean pore diameter of 50 nm. The pores are distributed in the flow body 15 to result in a porosity of greater than 50%, preferably greater than 75%, in particular greater than 80%, particularly preferably greater than 90%. The pores may include irregular structures, such as those in metal foams or sintered metals, or regular structures, such as those that are present in a honeycomb structure, a tubular structure, or a truss structure.

The membrane electrode assembly 20 comprises a membrane 21, which may be formed, for example, as a polymer electrolyte membrane (PEM). The membrane electrode assembly 20 may further include a gas diffusion layer 22. The gas diffusion layer 22 may be arranged on both sides of the membrane 21 or only on one side of the membrane 21. The gas diffusion layer 22 is also a porous material that is electrically conductive. However, the porosity and the pore diameter are usually smaller than the porosity and/or pore diameter of the flow body 31. The gas diffusion layer 22 is also electrically conductive, but usually includes no metallic material, but rather is made of carbonaceous materials, such as graphite.

Alternatively, the gas diffusion layer 22 may be replaced by a microporous layer 23 (shown in FIG. 5), which is characterized by a lower height. The microporous layer 23 has physical characteristics, such as material and porosity, similar to those of the flow body 31, but has a lower porosity. In particular, the pore diameters in the gas diffusion layer 22, as well as in the microporous layer 23, are smaller than a mean diameter of the pores in the flow body 31.

A fourth embodiment, shown in FIG. 6, shows the cross-section of the active region of a fuel cell stack 1 according to the invention that is formed asymmetrically. In this embodiment, the bipolar plate 10 is formed from two plate halves, with one of the plate halves 11 formed profiled in the active region. The profile structure provides flow channels 15 for reactant gases on one electrode side of the profiled plate half 11, and coolant channels 14 on an inside of the plate half 11 facing the other half of the plate. A gas distribution layer 30 with a porous flow body 31 is adjacent to the bipolar plate 10 on both sides. The gas distribution layers 30 are preferably developed differently in this embodiment. The gas distribution layer 30 adjacent to the non-profiled plate half includes the recesses 32 according to the invention. The gas distribution layer 30 adjacent to the flow channels 15, however, includes a flow body 31 without recesses 32.

The functional principle of the fuel cells according to the invention, shown in FIG. 6, results in particular from the asymmetrical design. Facing the one side of the bipolar plate 10, namely the profiled plate half 11, a flow field with flow channels 15 is formed, allowing for the transport or the distribution of a first reactant gas, while facing the other side of the bipolar plate, namely on the side of the second plate half, a flow body 31 is arranged, through which a second reactant gas is uniformly distributed over the active region of the bipolar plate in the electrode region. The diameter of the flow channels 15 is preferably greater than that of the recesses 32 so that the profiled plate half is preferably, but not necessarily, arranged on the cathode side. Alternatively, the embodiment of the anode compartment may relate to the cathode compartment. The anode compartment then accordingly includes the profiled bipolar plate.

The cumulative height of the non-profiled plate half 11 and the gas distribution layer 30 arranged thereon is smaller than the cumulative height of the profiled plate half 11 and the gas distribution layer arranged thereon.

The flow channels 15 of the profiled plate half 11 have essentially the same function, namely a uniform distribution of the respective reactant gas in the direction of extension of the fuel cell, as the preferably channel-like recesses 32 of the gas distribution layer 30 on the non-profiled side of the bipolar plate 10.

FIG. 7 shows a further preferred embodiment of the fuel cell stack 1 according to the invention. Membrane electrode assemblies 20 and bipolar plates 10 are each arranged alternately in the stack, with a gas distribution layer 30 according to the invention being arranged respectively between the membrane electrode assemblies 20 and the bipolar plates 10. The fuel cell stack 1 shown includes two embodiments of bipolar plates 10, 10', with a first embodiment 10 having coolant channels 14 in the interior and a second embodiment 10' having no coolant channels 14.

The embodiments of the fuel cell or fuel cell stack 1 according to the invention, shown in FIGS. 4 to 7, are characterized by a reduced height and thus an increased power density. The function of the recesses 32 according to the invention is to ensure uniform transport of the reactant gases in the direction of extension of the active region. In this case, the cross-section of the recesses 32 is formed such that it has the lowest possible flow resistance and thus minimizes the pressure loss of the reactant gases. Transverse to the direction of extension, the reactant gases are distributed via diffuse channels of the porous fill body 31.

LIST OF REFERENCE SYMBOLS 1 fuel cell
2 tension element
3 end plate
10 bipolar plate
10' bipolar plate without coolant channels
11 plate half
12 main gas channel
13 main coolant channel
13a active region
13b distribution region
14 coolant channel
15 flow channel
20 membrane electrode assemblyef
21 membrane 22 gas diffusion layer
23 microporous layer
30 gas distribution layer
31 porous flow body
32 recess

The invention claimed is:

1. A fuel cell stack, comprising:
first and second bipolar plates, the first and second bipolar plates including an active region, wherein each of the first and second bipolar plates includes a first plate half that is planar and a second plate half that is contoured, wherein the second plate half of the first bipolar plate faces toward the first plate half of the second bipolar plate;
a membrane electrode assembly positioned between the first and second bipolar plates;
a first gas distribution layer positioned between the membrane electrode assembly and the second plate half of the first bipolar plate, wherein the first gas distribution layer includes a porous flow body and does not include recesses in the active region; and
a second gas distribution layer positioned between the membrane electrode assembly and the first plate half of the second bipolar plate, wherein the second gas distribution layer includes a porous flow body and recesses in the active region, wherein the porous flow body of the second gas distribution layer includes a metallic material and wherein each of the first and second bipolar plates includes coolant channels between the respective first and second plate halves.

2. The fuel cell stack according to claim 1, wherein the recesses of the second gas distribution layer include discrete channels.

3. The fuel cell stack according to claim 2, wherein the discrete channels extend longitudinally over the active region.

4. The fuel cell stack according to claim 1, wherein the recesses of the second gas distribution layer include passage openings extending through the thickness of the second gas distribution layer.

5. The fuel cell stack according to claim 1, wherein the porous flow body of the second gas distribution layer has a macroporous structure.

6. The fuel cell stack according to claim 1, wherein the porous flow body of the second gas distribution layer is bonded to the first plate half of the second bipolar plate.

7. The fuel cell stack according to claim 1, wherein the membrane electrode assembly includes a respective gas diffusion layer adjacent to each of the first and second gas distribution layers, each of the gas diffusion layers having a porosity less than a porosity of the respective gas distribution layer.

8. The fuel cell stack according to claim 1, wherein the second plate half of the first bipolar plate faces a cathode side of the membrane electrode assembly.

9. A method of fabricating a fuel cell stack, comprising:
positioning a membrane electrode assembly between first and second bipolar plates, the first and second bipolar plates including an active region, wherein each of the first and second bipolar plates includes a first plate half that is planar and a second plate half that is contoured, wherein the second plate half of the first bipolar plate faces toward the first plate half of the second bipolar plate;
positioning a first gas distribution layer between the membrane electrode assembly and the second plate half of the first bipolar plate, wherein the first gas distribution layer includes a porous flow body and does not include recesses in the active region; and
positioning a second gas distribution layer between the membrane electrode assembly and the first plate half of the second bipolar plate, wherein the second gas distribution layer includes a porous flow body and recesses in the active region, wherein the porous flow body of the second gas distribution layer includes a metallic material and wherein each of the first and second bipolar plates includes coolant channels between the respective first and second plate halves.

10. The method according to claim 9, wherein the recesses of the second gas distribution layer include discrete channels.

11. The method according to claim 10, wherein the discrete channels extend longitudinally over the active region.

12. The method according to claim 9, wherein the recesses of the second gas distribution layer include passage openings extending through the thickness of the second gas distribution layer.

13. The method according to claim 9, wherein the porous flow body of the second gas distribution layer has a macroporous structure.

14. The method according to claim 9, wherein the porous flow body of the second gas distribution layer is bonded to the first plate half of the second bipolar plate.

15. The method according to claim 9, wherein the membrane electrode assembly includes a respective gas diffusion layer adjacent to each of the first and second gas distribution layers, each of the gas diffusion layers having a porosity less than a porosity of the respective gas distribution layer.

16. The method according to claim 9, wherein the second plate half of the first bipolar plate faces a cathode side of the membrane electrode assembly.

* * * * *